United States Patent Office 3,399,233
Patented Aug. 27, 1968

3,399,233
PROCESS FOR THE PREPARATION OF 2-ARYL-1,1,3,3-TETRAALKYL GUANIDINES
Perry A. Argabright and Vernon J. Sinkey, Littleton, Colo., assignors to Marathon Oil Company, Findlay, Ohio, a corporation of Ohio
No Drawing. Filed Dec. 17, 1965, Ser. No. 514,670
11 Claims. (Cl. 260—565)

ABSTRACT OF THE DISCLOSURE

Processes for the production of 2-aryl-1,1,3,3-tetraalkyl guanidine wherein the alkyl groups are selected from the group consisting of methyl, ethyl, primary propyl, hydrocarbon radicals in the noninterfering, nonhydrocarbon substituted derivatives thereof, comprising in combination the steps of treating aryl isocyanate wherein the aryl radical is an aryl hydrocarbon radical, with from 1 to about 50 moles per mole of aryl isocyanate of tetraalkylurea wherein the alkyl groups are as described above at a temperature of from about 100° C. to about 300° C.

---

The present invention relates to a new method for the formation of 2-aryl-1,1,3,3-tetraalkyl guanidine and its derivatives and in particular relates to a new method for the production of these compounds by reaction of tetraalkylureas with aryl isocyanates.

The compounds of the present invention are useful as chemical intermediates and the specific compound 2-phenyl-1,1,3,3-tetramethyl guanidine (PTMG) is an established herbicide used as disclosed in German Patent 1,089,210 to Kuehle and Ue. As described by H. Bredereck and K. Bredereck [Berichte, vol. 94, p. 2278 (1961)], PTMG is produced conventionally through the reaction of tetramethylurea with aniline and phosphorus oxychloride. The present invention eliminates the need for the highly corrosive phosphorus oxychloride starting material and in addition permits the production of PTMG and its derivatives without elaborate isolation and purification processes.

The reaction of the present invention proceeds as follows:

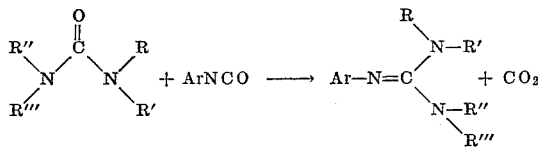

where R, R', R" and R"' may be alkyl for example, methyl, ethyl or propyl, and where Ar is an aryl group preferably selected from phenyl and its meta and para substituted noninterfering derivatives and naphthyl. Any substituents will in all cases preferably be nonhydrocarbon substituents.

The starting materials for the practice of the present invention are therefore a tertraalkylurea preferably selected from the group consisting of tetramethylurea, tetraethylurea, triethylmethylurea, dimethyldiethylurea and trimethylethylurea; an aryl isocyanate selected from the group consisting of phenyl isocyanate and naphthalene isocyanate; and the noninterfering (with the reaction of the present invention) derivatives of the above.

The selection of these raw materials is strikingly critical; use of even normal-butyl isocyanate failed to produce reaction in any substantial yield. In addition, use of longer alkyl groups or phenyl groups on the tetraalkylurea failed to produce the end products of the present invention in commercially significant yields.

Preferably from about 1 to about 50 and most preferably 4 to 10 moles of the tetraalkylurea will be used for each mole of the aryl isocyanate present in the reaction mixture. The reaction is generally operable at from 100 to about 300° C. but temperatures of from 125 to 250° C. are preferred and temperatures of from 150 to 200° C. are considered optimum. The reaction time is not critical and will depend to a large etxent upon the temperatures and the specific starting materials employed. In general, the reaction time will be of the order of from about 1 minute to about 100 hours and preferably from about 15 minutes to about 72 hours, but reaction times outside these limits may be desirable under certain circumstances.

While not narrowly critical, pressure will in most instances preferably be from about 0.5 to about 50 atm. and will most preferably be approximately atmospheric. The reaction may be conducted on a flow basis, but in most cases batch methods will be preferred. Catalysts may be found useful in certain instances, but are not essential to the practice of the invention. Similarly, although in some instances reaction media, e.g., liquids which are inert to the reactions of the present invention may be found useful, in most instances no reaction media will be desirable and the concentrated products produced in the absence of reaction media will be preferred. An inert atmosphere over the reaction will be highly preferred.

The novel synthesis of this invention can be applied to the production of high molecular weight poly-1,3-guanidines in accordance with the following equation:

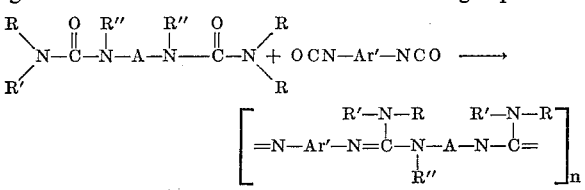

where R, R' and R" are as specified above and A is a divalent aliphatic radical such as ethylene (—CH$_2$—CH$_2$—)

and trimethylene (—CH$_2$—CH$_2$—CH$_2$—) and Ar' is a divalent aryl group such as p-phenylene,

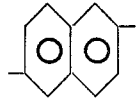

and p,p'-diphenylene.

The invention will be better understood by reference to the example which follows. This example is to be taken as being merely illustrative of the invention and should not be considered as narrowing the scope of the invention in any way.

Example I

A solution of phenyl isocyanate (11.9 g., 0.100 mole) and tetramethylurea (45.2 g., 0.400 mole) is heated at approximately 160° C. under a nitrogen atmosphere for approximately 66 hours. After this time, all of the phenyl isocyanate has been consumed. After removing the unreacted (excess) tetramethylurea by vacuum distillation, the product, 1,1,3,3-tetramethyl-2-phenyl guanidine, is distilled as a colorless liquid. The boiling point is found to be 65° C. at 0.04 mm.; the index of refraction, $n^{22}$, is found to be 1.5707. The literature values of the boiling point and index of refraction are, B.P. 130° C. at 10 mm.; $n_D^{20}$, 1.5696, and the structure is further confirmed by nuclear magnetic resonance and infrared spectroscopy according to standard techniques. The yield of product is 13.5 g. corresponding to a yield of 70.5% of theoretical.

Example II

A solution of p-phenylene diisocyanate (16.0 g., 0.10 mole) and ethylene bis(trimethylurea) (20.6 g., 0.10 mole) is heated at 180–200° C. for 72 hours. The resulting sparingly soluble polymeric product is shown by infrared analysis to contain the desired guanidine links.

In summary, the invention comprises a process for the production of 2-aryl-1,1,3,3-tetraalkyl guanidine wherein the alkyl groups are selected from the group consisting of methyl, ethyl, primary propyl hydrocarbon radicals and the noninterfering, nonhydrocarbon-substituted derivatives thereof comprising in combination the steps of treating aryl isocyanate wherein the aryl radical is selected from the group consisting of aryl hydrocarbon radicals and the noninterfering, nonhydrocarbon-substituted derivatives thereof with from 1 to about 50 moles per mole of aryl isocyanate to tetraalkylurea wherein the alkyl groups are as described above at a temperature from about 100 to about 300° C.

What is claimed is:

1. A process for the production of 2-aryl-1,1,3,3-tetraalkyl guanidine wherein the alkyl groups are selected from the group consisting of methyl, ethyl, primary propyl hydrocarbon radicals comprising in combination the steps of treating aryl isocyanate wherein the aryl radical is selected from the group consisting of phenyl and naphthalene with from 1 to about 50 moles per mole of aryl isocyanate of tetraalkylurea wherein the alkyl groups are as described above at a temperature from about 100 to about 300° C.

2. A process for claim 1 wherein the reaction is conducted at from about 140 to about 180° C. under an inert atmosphere.

3. The process of claim 1 wherein the reaction is carried out in a reaction mixture consisting essentially of the starting materials and in the absence of a catalyst.

4. The process of claim 1 wherein the aryl isocyanate is phenyl isocyanate.

5. A process of claim 1 wherein the aryl isocyanate is naphthyl isocyanate.

6. The process of claim 4 wherein the alkyl group is a methyl group.

7. The process of claim 4 wherein the alkyl group is an ethyl radical.

8. The process of claim 4 wherein the alkyl group is a primary propyl radical.

9. The process of claim 5 wherein the alkyl group is a methyl radical.

10. The process of claim 5 wherein the alkyl group is an ethyl radical.

11. The process of claim 5 wherein the alkyl group is a primary propyl radical.

References Cited
UNITED STATES PATENTS 3,189,648　6/1965　Gerjovich _____ 260—564

CHARLES B. PARKER, *Primary Examiner.*

ROBERT V. HINES, *Examiner.*